United States Patent
Kajita

(10) Patent No.: US 7,231,950 B2
(45) Date of Patent: Jun. 19, 2007

(54) PNEUMATIC RADIAL TIRE

(75) Inventor: Hiroaki Kajita, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 68 days.

(21) Appl. No.: 10/495,193

(22) PCT Filed: Dec. 13, 2002

(86) PCT No.: PCT/JP02/13109

§ 371 (c)(1),
(2), (4) Date: May 11, 2004

(87) PCT Pub. No.: WO03/055699

PCT Pub. Date: Jul. 10, 2003

(65) Prior Publication Data

US 2005/0016653 A1 Jan. 27, 2005

(30) Foreign Application Priority Data

Dec. 27, 2001 (JP) .......................... 2001-397532

(51) Int. Cl.
*B60C 9/00* (2006.01)
*B60C 15/00* (2006.01)
(52) U.S. Cl. ................ 152/526; 152/534; 152/535; 152/538; 152/539; 152/555
(58) Field of Classification Search ........... 152/526, 152/534, 535, 537, 555, 539
See application file for complete search history.

(56) References Cited

FOREIGN PATENT DOCUMENTS

| JP | 62-4615 A | | 1/1987 |
| JP | 63-85404 U | | 6/1988 |
| JP | 04163215 | * | 6/1992 |
| JP | 4-278810 A | | 10/1992 |
| JP | 6-255320 | * | 9/1994 |
| JP | 11-34618 A | | 2/1999 |
| JP | 2001-71714 A | | 3/2001 |
| JP | 2001191744 | * | 7/2001 |
| JP | 2001-277820 A | | 10/2001 |

* cited by examiner

*Primary Examiner*—Justin R. Fischer
(74) *Attorney, Agent, or Firm*—Birch, Stewart, Kolasch & Birch, LLP

(57) ABSTRACT

A pneumatic radial tire 1 including a carcass 6 and a belt layer 7 is provided with a cord-reinforced layer 12 with reinforcing cords of organic fiber being disposed at angles of 30 to 60 degrees with respect to a tire circumferential direction at a buttress portion Bs thereof. A ply turnup portion 11 of the carcass 6 is terminated radially outside a tire maximum width point M. The cord-reinforced layer 12 is arranged such that its outer end portion in the radial direction 12U is pinched between the carcass 6 and the belt layer 7 and such that its radially inner end portion 12L is secured between the ply main portion 10 and the ply turnup portion 11 of the carcass 6.

4 Claims, 3 Drawing Sheets

PNEUMATIC RADIAL TIRE

TECHNICAL FIELD

The present invention relates to a pneumatic radial tire of improved high speed durability due to the provision of a cord-reinforced layer at a buttress portion.

BACKGROUND ART

In a radial tire including a belt layer that is disposed outside of a carcass and a tread portion being reinforced to exhibit hoop effects, the restraining force of the belt layer will be decreased at an outer end portion thereof so that lifting is apt to be caused at a shoulder portion of the tire through centrifugal force or other factors when performing high speed running. The durability consequently tends to be decreased such that, for instance, peeling and damages are caused originating at the outer end of the belt layer.

To suppress the lifting and increase the high speed running durability performance, conventionally, a band layer around which band cords made of nylon or similar are spirally wound in a tire circumferential direction is provided outside of the belt layer so as to complement restraining force at the outer end portion of the belt layer. It is known that a tire reinforced by the band layer exhibits superior high speed durability performances in high speed durability tests (for instance, standard tests such as ECE 30 etc.) of so-called step speed method in which speed up is performed by a ratio of 10 km/h per every 20 minutes.

Through various experiments that have been performed by the inventors, it has been found that no sufficiently satisfactory effects in durability have been achieved by the above tire when continuous high speed running was made under the condition close to actual usage such as in the case where it was made to run at high speed for a long period of time. This is assumed to be due to the fact that the buttress portion outside in the tire axial direction is more largely affected rather than the belt layer, wherein the buttress portion is gradually raised by the high speed running lasting for a long time so as to cause lifting of the shoulder portion.

The present invention thus aims to provide a pneumatic radial tire in which movements of the buttress portion and lifting of the shoulder portion are effectively restricted, and high speed durability is improved not only when a step speed method is employed, but also when continuous high speed running is conducted under the condition close to actual usage. For such purpose, the present invention basically provides a structure of a pneumatic radial tire in which a cord-reinforced layer, the radially outer end thereof being secured between a carcass and a belt layer and the radially inner end thereof being secured between a ply main portion and a ply turnup portion of the carcass, is provided at the buttress portion.

DISCLOSURE OF THE INVENTION

For achieving the above objects, the present invention relates to a pneumatic radial tire comprising a carcass that includes at least one carcass ply in which a ply main portion that extends from a tread portion over a side wall portion up to a bead core of a bead portion is integrally formed with a ply turnup portion that is turned up around the bead core from inside to outside in an axial direction of the tire, and a belt layer that includes two belt plies that are disposed inside of the tread portion and outside of the carcass in the radial direction, wherein the outer end portion in the radial direction of the ply turnup portion of the carcass is terminated at a position radially outside a tire maximum width point, wherein a buttress portion is provided with a cord-reinforced layer extending along an outer surface of the carcass with reinforcing cords of organic fiber being disposed at angles of 30 to 60 degrees with respect to a tire circumferential direction, and wherein the cord-reinforced layer is arranged such that its radially outer end portion is secured between the carcass and the belt layer and that its radially inner end portion is secured between the ply main portion and the ply turnup portion of the carcass.

The cord-reinforced layer is preferably arranged such that a width of an upper overlapping portion at which the radially outer end overlaps with the belt layer is set to be 20 to 40 mm while a width of a lower overlapping portion at which the radially inner end portion overlaps with the ply turnup portion is set to be 10 to 20 mm.

It is preferable to arrange the belt layer such that its axially outer end is covered by a band layer in which band cords are disposed at angles of not more than 5 degrees in the circumferential direction.

It is preferable that the carcass comprises a radially inner carcass ply and a radially outer carcass ply and that an outer end of the ply turnup portion of the outer carcass ply is terminated at a position radially inside an inner end portion of the cord-reinforced layer so that a spaced portion is formed therebetween.

BEST MODE FOR CARRYING OUT THE INVENTION

Figure 1:
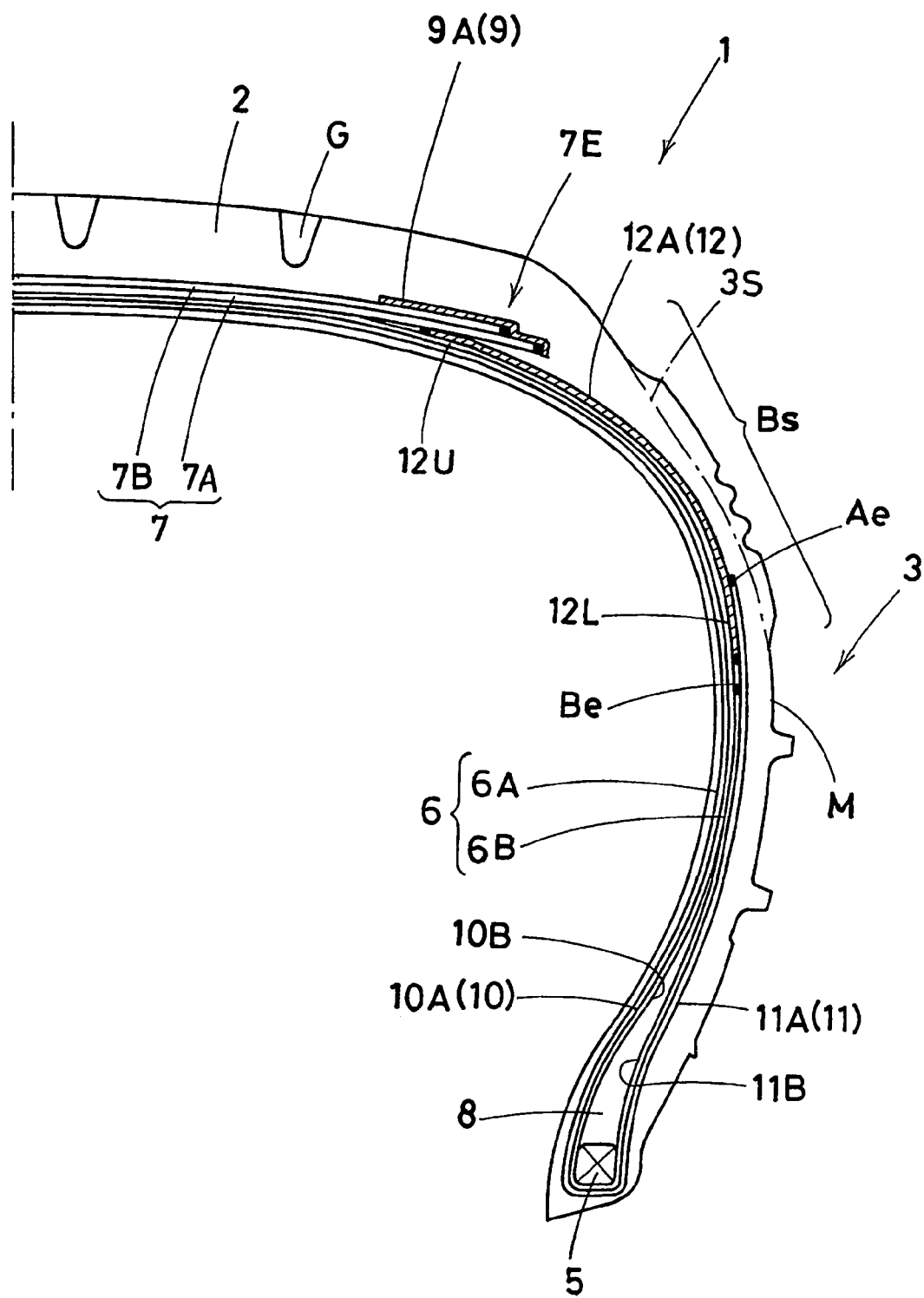
FIG. 1 is a sectional view of a tire according to one embodiment of the present invention.

An embodiment of the present invention will now be explained with reference to the illustrated examples. FIG. 1 illustrates a sectional view illustrating a case in which the pneumatic radial tire of the present invention is a 4WD tire that may be concurrently used for off-road purposes.

In FIG. 1, the pneumatic radial tire 1 comprises a carcass 6 extending from a tread portion 2 over a side wall portion 3 up to a bead core 5 of a bead portion 4 as well as a belt layer 7 that is disposed inside of the tread portion 2 and outside in the radial direction of the carcass 6.

The carcass 6 comprises more than one carcass ply of radial arrangement in which carcass cords are disposed at angles of, for instance, 75 to 90° with respect to the tire circumferential direction, wherein two carcass plies 6A, 6B are provided in the present embodiment. Favorably used carcass cords may be organic fiber cords such as nylon, polyester, rayon or aromatic polyamide.

Each of the carcass plies 6A, 6B comprises a ply turnup portion 11 that is turned up from inside to outside of around bead core 5 at each end of a ply main portion 10 extending between the bead cores 5, 5, wherein a bead apex rubber 8 extending radially outward from the bead cores is disposed between the ply main portion 10 and the ply turnup portion 11 for bead reinforcement.

At least one of the carcass plies 6A, 6B (in the present embodiment, the radially inner carcass ply 6A) is arranged such that its ply turnup portion 11A is terminated after being turned up to extend beyond the bead apex rubber 8 up to a position radially outward the tire maximum width point M. In the present embodiment, the radially outer carcass ply 6B is similarly arranged such that its ply turnup portion 11B is terminated after being turned up to a position radially outward the tire maximum width point M. In this case, an outer end portion Be of the ply turnup portion 11B (hereinafter may be referred to as "turnup end portion Be") is terminated radially inside an outer end portion Ae of the ply turnup portion 11A (hereinafter may be referred to as "turnup end portion Ae") such that the turnup end portion Be is covered and protected by the ply turnup portion 11A and loosening of cord ends may be suppressed.

The "tire maximum width point M" is an axially outermost point where an outline 3S of the side wall portion 3 juts when seen from a meridian section of the tire, excluding any partial concaves or convexes such as decorative serrations, ribs for indicating marks or protect ribs for protective purposes.

Next, the belt layer 7 comprises two belt plies 7A, 7B in which belt cords are disposed at angles of, for instance, 10 to 30° with respect to the tire circumferential direction. The belt plies 7A, 7B overlap the belt cords of the plies so as to cross each other, and thereby the belt rigidity is improved and strong reinforcement over substantially the entire width of the tread surface 2 is obtained with hoop effects. Steel cords may be favorably employed for the belt cords, and further, organic fiber cords of high modulus, such as polyethylene naphthalate (PEN), polyethylene telephthalate (PET) or aromatic polyamide may be employed if required.

In the present embodiment, a band layer 9 is provided outside of the belt layer 7, which comprises a band ply 9A in which band cords of organic fiber such as nylon are disposed at an angle of not more than 5 degrees with respect to the circumferential direction for the purpose of complementing decrease in restraining force at an outer end portion 7E of the belt layer 7 (hereinafter may be referred to as "belt end portion 7E") and of improving durability against high speed. For the band ply 9A, a pair of right and left edge band plies covering only the belt end portion 7E or a full band ply covering substantially the entire width of the belt layer 7 may be employed, and the band layer 9 is formed by using either of them, or both in combination. The present embodiment illustrates a case in which the band layer 9 comprises edge band plies.

In the present embodiment, a cord-reinforced layer 12 extending along an outer surface of the carcass 6 is provided at a buttress portion Bs of the tire 1.

Such a cord-reinforced layer 12 comprises a reinforcing ply 12 in which reinforcing cords of organic fiber are disposed at angles of 30 to 60 degrees, favorably 40 to 50 degrees, with respect to the tire circumferential direction, and is superposed on the outer surface of the ply main portion 10 of the carcass 6 to extend in and outside in the radial direction.

Figure 2:
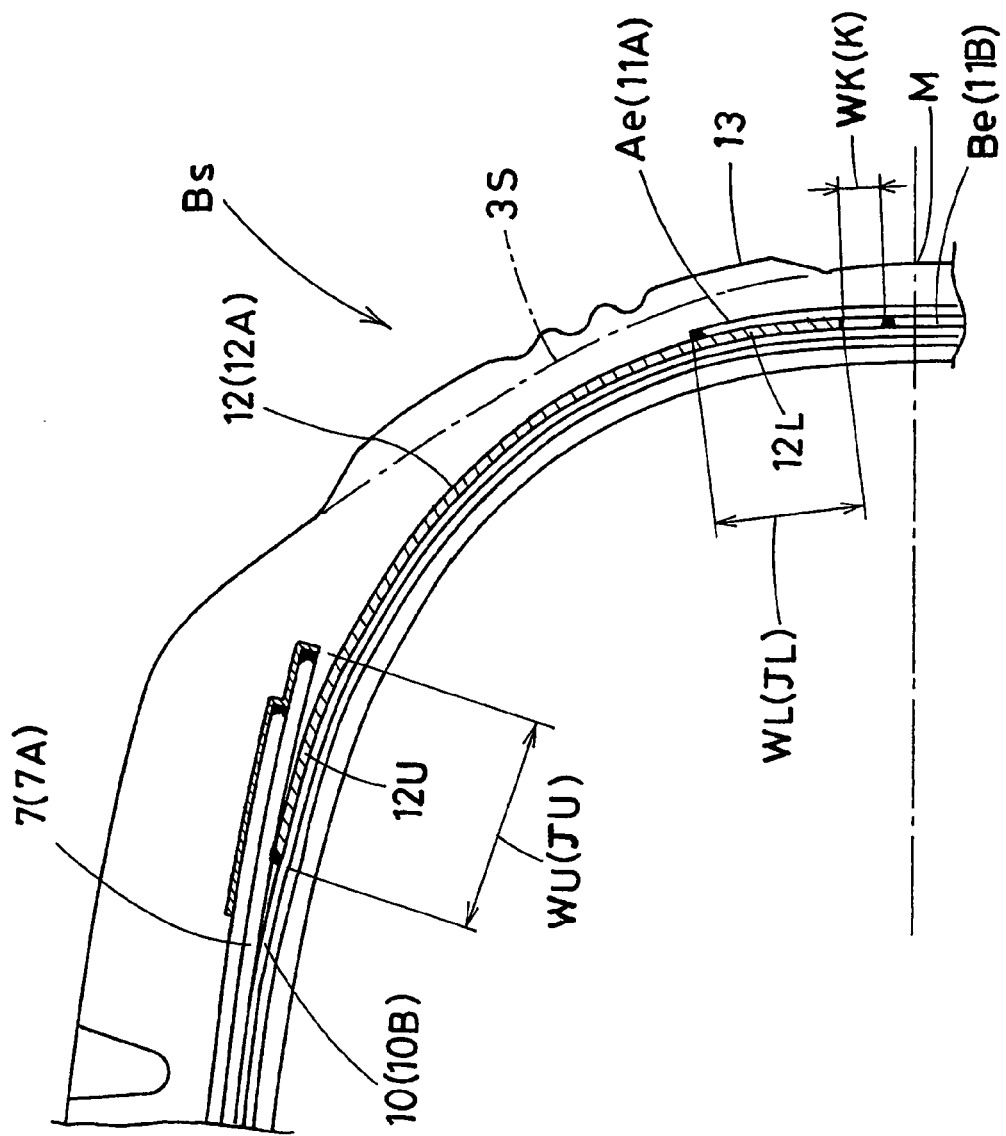
FIG. 2 is a sectional view enlargedly showing a main part thereof.

As illustrated in FIG. 2, the cord-reinforced layer 12 is arranged such that its outer end portion in the radial direction 12U is terminated after being secured between the ply main portion 10 and the belt layer 7 while its radially inner end portion 12L is terminated after being secured between the ply main portion 10 and the ply turnup portion 11.

In this manner, by arranging the cord-reinforced layer 12 with both of the outer end portion 12U and the inner end portion 12L being secured, the carcass 6, the belt layer 7 and the cord-reinforced layer 12 may be organically combined to effectively reinforce the buttress portion Bs. Particularly, since the reinforcing cords are disposed so as to cross with the carcass cords with an angle of at least 15 degrees, the rigidity of the buttress portion Bs is improved so as to restrain its movements, and accordingly, raising of the buttress portion to radially outward can be suppressed.

At an upper overlapping portion JU at which the outer end portion 12U overlaps with the belt layer 7, a firm truss structure in which all of the belt cords, reinforcing cords and the carcass cords intersect with each other is formed so as to improve hoop effects at the belt end portion 7E. Accordingly, together with the effect of restricting raising at the buttress portion Bs, it is possible to restrict lifting of the shoulder portion effectively, and high speed durability when continuing running is performed in a state close to actual usage may be remarkably improved in addition to high speed durability when employing a step speed method.

It should be noted that in case the band layer 9 is provided as in the present embodiment, it is possible to form an even firmer truss structure at the upper overlapping portion JU in which the band cords, the belt cords, the reinforcing cords and the carcass cords intersect with each other so as to obtain an embodiment which is more preferable for improving high speed durability.

To effectively exhibit the effects of improvement of high speed durability, a width WU along the cord-reinforced layer 12 of the upper overlapping portion JU is preferably defined to be 20 to 40 mm. Where the width WU is less than 20 mm, effects of high speed durability improvement cannot be sufficiently secured, or further, the high speed durability might be decreased such as in the case where loosening of cord ends originating at end edges of the outer end portion 12U is induced. On the other hand, where the width WU exceeds 40 mm, it will not only be impossible to count on effects of further improving high speed durability but the riding comfort tends to be harmed, since the rigidity of the tread portion 2 is excessively increased.

Where longitudinal grooves G extending in the tire circumferential direction are formed on the tread portion 2, the end of the outer end portion 12U is required to be shifted either axially inside or outside from groove bottom positions of the longitudinal grooves G. If the end is located beneath the groove bottom position, a position with weak rigidity is formed on the tire, and the belt layer 7 is bent at the position of the end causing the belt damage.

The inner end portion 12L of the cord-reinforced layer 12 overlaps with the turnup end portion Ae to form an overlapping portion JL, and thereby movements of the inner end portion 12L are restrained and the inner end portion 12L is covered and protected so that the effect of high speed durability improvement may be achieved. For this purpose, it is preferable to set a width WL of the overlapping portion JL along the cord-reinforced layer 12 to be 10 to 20 mm. Where the width WL is less than 10 mm, reinforcing effects for the buttress portion Bs achieved by the cord-reinforced layer 12 will be insufficient and loosening of cord ends tends to be caused at the end of the inner end portion 12L. When the width WL exceeds 20 mm, the end portion will come closer to the outer end of the bead apex rubber 8, distortion may be increased causing cord loosening or decreased ride comfort.

When the carcass 6 comprises two plies as in the present embodiment, it is preferable that the turnup end portion Be of the outer carcass ply 6B is terminated radially inside the inner end portion 12L to form a spaced portion K between the same and the inner end portion 12L. This is for the purpose of restricting differences in rigidity owing to overlapping as much as possible for avoiding damages due to stress focusing. It is preferable to secure a distance WK of not less than 5 mm for the spaced portion K so as to achieve more favorable spreading of stress at respective ends of the inner end portion 12L and the turnup end portion Be and to restrict loosening of cord ends.

While low modulus organic fiber cords such as nylon, polyester or rayon may be employed as the reinforcing cords, high modulus organic fiber cords such as polyethylene naphthalate (PEN), polyethylene telephthalate (PET) or aromatic polyimide are more favorably employed in view of reinforcing effects.

When the tire 1 of the embodiment is formed as a 4 WD tire that may be concurrently used for off-road purposes as in this embodiment, the cord-reinforced layer 12 not only functions to improve high speed durability, but also serves as a protective layer which improves cut resistance at the buttress portion Bs and protects the carcass 6 from crack damages caused through contact with rocks.

In such a case, it is preferable to provide a circumferentially extending protect rib 13, protuberated from the outline 3S, is formed in the buttress portion Bs, for protection. Here, the end of the turnup end portion Ae is preferably covered by the protect rib 13 so as to be protected from crack damages.

Figure 3:
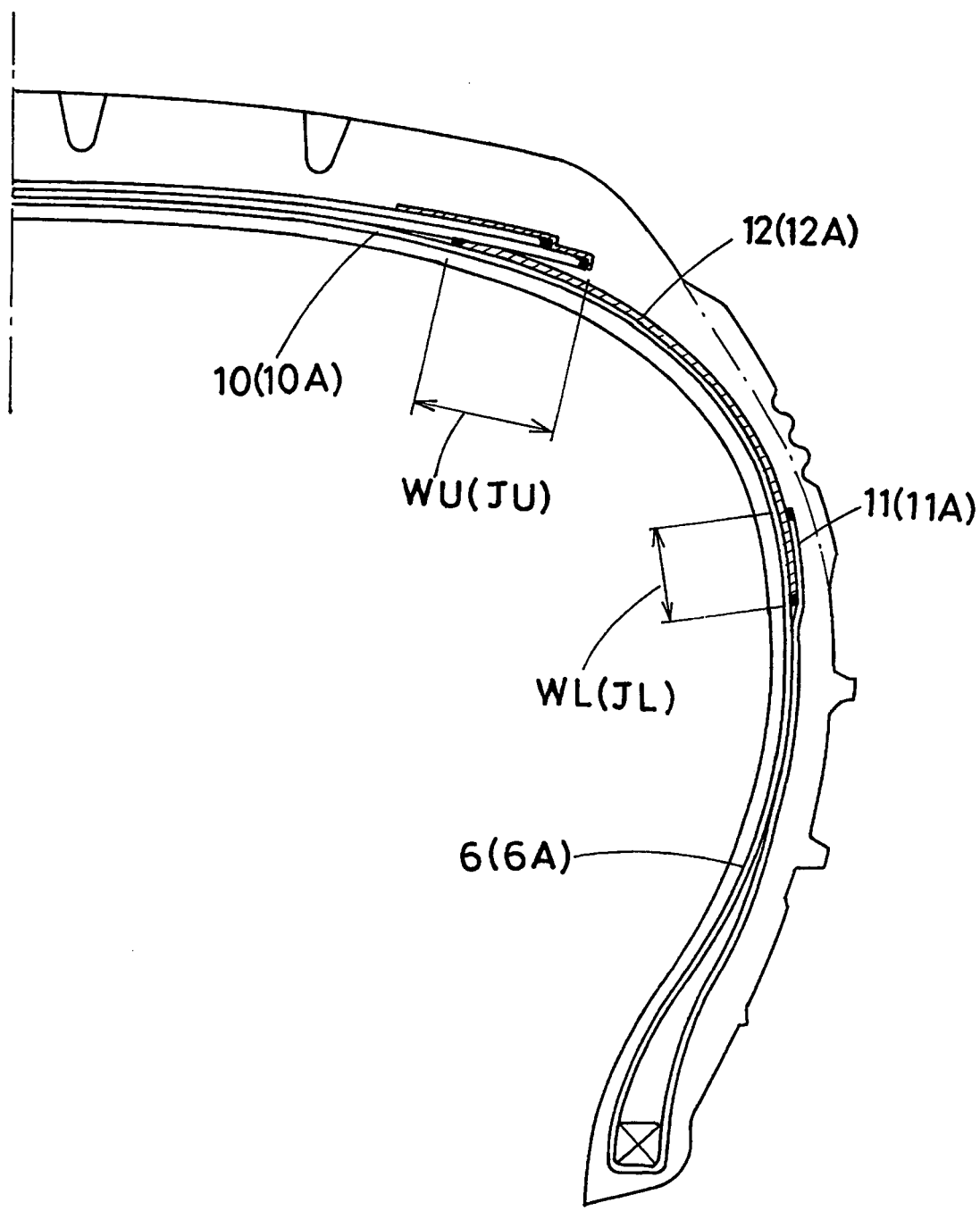
FIG. 3 is a sectional view showing another embodiment of the present invention.

FIG. 3 illustrates a case in which the carcass 6 comprises the inner carcass ply 6A only.

While a particularly preferred embodiment of the present invention has been described above in details, the present invention is not limited to the illustrated embodiments but may be embodied upon modification into various forms.

EXAMPLE

4WD tires having a size of 265/70R16 were manufactured by way of trial according to the specifications of Table 1, and the high speed durability of the respective sample tires was measured while performing continuous running at standard internal pressure and continuous running at decreased internal pressure employing a step speed method, and the shock resisting performance of buttress portions was tested. Specifications other than those of Table 1 are identical.

(1) High Speed Durability (Step Speed Method)

In accordance with ECE30, sample tires were made to run on a drum using a step speed method of 10 km/h per 20 minutes with defined conditions for the rim (16×7 JJ), internal pressure (200 kPa) and load (8.79 kN) for measuring the speed and time when the tires broke down.

(2) High Speed Durability (Continuous Running at Standard Internal Pressure)

Sample tires were made to run on a drum with defined conditions for the rim (16×7JJ), internal pressure (200 kPa), load (8.79 kN) and speed (170 km/h) for measuring the running distance at which the tires broke down.

(3) High Speed Durability (Continuous Running at Decreased Internal Pressure)

Sample tires were made to run on a drum with defined conditions for the rim (16×7JJ), internal pressure (140 kPa), load (8.79 kN) and speed (170 km/h) for measuring the running distance at which the tires broke down.

(4) Shock-Resisting Performance

Plunger breakdown tests in accordance with JIS D4230 were performed for measuring plunger values at buttress portions.

TABLE 1

|  | Example 1 | Example 2 | Comparative example 1 | Comparative example 2 | Comparative example 3 |
|---|---|---|---|---|---|
| Band layer | Nylon | Nylon | Nylon | Nylon | Nylon |
| Ply | Edge ply | Edge ply | Edge ply | Edge ply | Edge ply |
| Cord angle | 0 degree (spiral) | 0 degree (spiral) | 0 degree (spiral) | 0 degree (spiral) | 0 degree (spiral) |
| Belt layer | Steel | Steel | Steel | Steel | Steel |
| Ply | Two | Two | Two | Two | Two |
| Cord angle (degree) | +26/−26 | +26/−26 | +26/−26 | +26/−26 | +26/−26 |
| Carcass | Polyester | Polyester | Polyester | Polyester | Polyester |
| Ply | Two | One | Two | One | Two |
| Cord angle (degree) | +88/−88 | 90 | +88/−88 | 90 | +88/−88 |
| Cord-reinforced layer | Nylon | Nylon | — | — | Nylon |
| Cord angle (degree) | 45 | 45 | — | — | 45 |
| Overlapping width WU (mm) | 30 | 30 | — | — | 10 |
| Overlapping width WL (mm) | 15 | 15 | — | — | 5 |
| Spaced width WK (mm) | 5 | 5 | — | — | 15 |
| High speed durability |  |  |  |  |  |
| Step speed method | 210 km/h (19 minutes) | 220 km/h (19 minutes) | 200 km/h (0 minute) | 210 km/h (5 minutes) | 200 km/h (11 minutes) |
| Continuous running at standard internal pressure | 12700 km | 13800 km | 2286 km | 5100 km | 6500 km |
| Continuous running at decreased internal pressure | 1500 km | 1400 km | 100 km | 90 km | 400 km |
| Shock-resisting performance | 234 J | 189 J | 160 J | 120 J | 230 J |

It can be confirmed from the test results that those of the Examples are capable of remarkably improving high speed durability particularly when performing continuous running at standard internal pressure and decreased internal pressure when compared to those of the comparative examples, and that they are extremely effective in improving high speed durability in actual vehicles.

INDUSTRIAL APPLICABILITY

As explained so far, the pneumatic radial tire according to the present invention is provided with a cord-reinforced layer, in which the radially outer end portion is secured between a carcass and a belt layer and in which the radially inner end portion is secured between a ply main portion and a ply turnup portion of the carcass, at the buttress portion thereof. With this arrangement, movements of the buttress portion can be effectively restrained, lifting of the shoulder portion can be restricted and high speed durability can be improved when the step speed method is employed, and additionally, durability when continuous high speed running is performed in a state close to actual usage.

The invention claimed is:

1. A pneumatic radial tire comprising a carcass that includes at least one carcass ply in which a ply main portion that extends from a tread portion over a side wall portion up to a bead core of a bead portion is integrally formed with ply turnup portion that is turned up around the bead core from axially inside to outside of the tire, and a belt layer that includes two belt plies that are disposed inside of the tread portion and radially outside of the carcass, wherein, the radially outer end portion of the ply turnup portion of the carcass is terminated radially outside the tire maximum width point, wherein a buttress portion is provided with a cord-reinforced layer extending along an outer surface of the carcass with reinforcing cords of organic fiber being disposed at angles of 40 to 50 degrees with respect to a tire circumferential direction, wherein the cord-reinforced layer is arranged such that its radially outer end portion is secured between the carcass and the belt layer and such that its radially inner end portion is secured between the ply main portion and the ply turnup portion of the carcass, and wherein the cord-reinforced layer is arranged such that a width of an upper overlapping portion at which the radially outer end portion overlaps with the belt layer is set to be 20 to 40 mm while a width of a lower overlapping portion at which the radially inner end portion overlaps with the ply turnup portion is set to be 10 to 20 mm.

2. The pneumatic radial tire as claimed in claim 1, wherein the belt layer is arranged such that its axially outer end portion is covered by a band layer in which band cords are disposed at angles of not more than 5 degrees in the tire circumferential direction.

3. The pneumatic radial tire as claimed in claim 1, wherein the carcass comprises a radially inner carcass ply and a radially outer carcass ply, and an outer end portion of the ply turnup portion of the outer carcass ply is terminated radially inside an inner end portion of the cord-reinforced layer so that a spaced portion is formed between the same and the inner end portion.

4. The pneumatic radial tire as claimed in claim 2, wherein the carcass comprises a radially inner carcass ply and a radially outer carcass ply, and an outer end portion of the ply turnup portion of the outer carcass ply is terminated radially inside an inner end portion of the cord-reinforced layer so that a spaced portion is formed between the same and the inner end portion.

* * * * *